(12) United States Patent
Lee et al.

(10) Patent No.: US 11,276,859 B2
(45) Date of Patent: Mar. 15, 2022

(54) NEGATIVE ACTIVE MATERIAL FOR RECHARGEABLE LITHIUM BATTERY, METHOD FOR PREPARING SAME, NEGATIVE ELECTRODE INCLUDING THE SAME AND RECHARGEABLE LITHIUM BATTERY INCLUDING SAME

(71) Applicant: Samsung SDI Co., Ltd., Yongin-si (KR)

(72) Inventors: Eunjoo Lee, Yongin-si (KR); Jaehou Nah, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 218 days.

(21) Appl. No.: 16/560,522

(22) Filed: Sep. 4, 2019

(65) Prior Publication Data

US 2020/0083536 A1    Mar. 12, 2020

(30) Foreign Application Priority Data

Sep. 7, 2018   (KR) ........................ 10-2018-0106955

(51) Int. Cl.
*H01M 4/587* (2010.01)
*H01M 4/36* (2006.01)
(Continued)

(52) U.S. Cl.
CPC ........... *H01M 4/587* (2013.01); *H01M 4/366* (2013.01); *H01M 10/0525* (2013.01);
(Continued)

(58) Field of Classification Search
CPC ....... H01M 10/0525; H01M 2004/021; H01M 2004/027; H01M 4/0471; H01M 4/133;
(Continued)

(56) References Cited

U.S. PATENT DOCUMENTS 5,419,883 A    5/1995   Ogawa et al.
6,139,990 A    10/2000  Kubota et al.
(Continued)

FOREIGN PATENT DOCUMENTS

CN    1237003 A    12/1999
CN    1516305 A    7/2004
(Continued)

OTHER PUBLICATIONS

Japanese Intellectual Property Office Action for corresponding Japanese Application No. 2019-163130, dated Aug. 31, 2020, 4 pages.
(Continued)

*Primary Examiner* — Lingwen R Zeng
(74) *Attorney, Agent, or Firm* — Lewis Roca Rothgerber Christie LLP (57) ABSTRACT

A negative active material for a rechargeable lithium battery includes natural graphite including secondary particles in which a plurality of primary particles are assembled; amorphous carbon on the surface of the primary particles; and a coating layer including amorphous carbon surrounding the secondary particles, wherein the primary particles have an average particle diameter of about 5 μm to about 15 μm, the secondary particles have an average particle diameter of about 8 μm to about 24 μm, and a peak intensity ratio I(002)/I(110) is less than or equal to about 120 as measured by X-ray diffraction.

15 Claims, 2 Drawing Sheets

(51) Int. Cl.
  *H01M 10/0525* (2010.01)
  *H01M 4/02* (2006.01)
  *H01M 4/133* (2010.01)
  *H01M 4/1393* (2010.01)

(52) U.S. Cl.
  CPC .......... *H01M 4/133* (2013.01); *H01M 4/1393* (2013.01); *H01M 2004/021* (2013.01); *H01M 2004/027* (2013.01); *Y02E 60/10* (2013.01); *Y02P 70/50* (2015.11)

(58) Field of Classification Search
  CPC .... H01M 4/1393; H01M 4/366; H01M 4/587; Y02E 60/10; Y02P 70/50
  See application file for complete search history.

(56) References Cited

U.S. PATENT DOCUMENTS

| | | | |
|---|---|---|---|
| 6,482,547 B1 | 11/2002 | Yoon et al. | |
| 2002/0197534 A1* | 12/2002 | Fukuda | H01M 4/587 429/231.4 |
| 2004/0137328 A1 | 7/2004 | Kim et al. | |
| 2005/0266314 A1 | 12/2005 | Sheem et al. | |
| 2006/0062717 A1 | 3/2006 | Tokuoka et al. | |
| 2010/0285359 A1 | 11/2010 | Hwang et al. | |
| 2011/0195313 A1 | 8/2011 | Lee et al. | |
| 2011/0281180 A1* | 11/2011 | Kim | H01M 4/134 429/338 |
| 2013/0309578 A1 | 11/2013 | Umeno et al. | |
| 2014/0178762 A1 | 6/2014 | Lee et al. | |
| 2015/0180019 A1 | 6/2015 | Lee et al. | |
| 2015/0318545 A1 | 11/2015 | Satow et al. | |
| 2017/0062823 A1 | 3/2017 | Yamaguchi et al. | |
| 2017/0162869 A1 | 6/2017 | Shim et al. | |
| 2017/0187041 A1 | 6/2017 | Yamada et al. | |
| 2017/0352868 A1 | 12/2017 | Zhamu et al. | |
| 2017/0352871 A1* | 12/2017 | Kim | H01M 10/651 |
| 2019/0198863 A1 | 6/2019 | Lee | |
| 2019/0229325 A1 | 7/2019 | Ahn et al. | |
| 2019/0355971 A1 | 11/2019 | Kim | |
| 2020/0148545 A1 | 5/2020 | Spahr et al. | |
| 2020/0185720 A1 | 6/2020 | Lee et al. | |

FOREIGN PATENT DOCUMENTS

| | | | |
|---|---|---|---|
| CN | 1848489 A | 10/2006 | |
| CN | 102244251 A | 11/2011 | |
| CN | 103560233 A | 2/2014 | |
| CN | 106486671 A | 3/2017 | |
| CN | 106663808 A | 5/2017 | |
| JP | 7-300313 A | 11/1995 | |
| JP | 10-312806 A | 11/1998 | |
| JP | 11-263612 A | 9/1999 | |
| JP | 2001-283844 A | 10/2001 | |
| JP | 2002-367611 A | 12/2002 | |
| JP | 2012-216521 A | 11/2012 | |
| JP | 2013-201125 A | 10/2013 | |
| JP | 2016-184581 A | 10/2016 | |
| JP | WO2014/103281 A1 | 1/2017 | |
| JP | 2017-45574 A | 3/2017 | |
| KR | 10-2006-0051305 A | 5/2006 | |
| KR | 10-2014-0099988 A | 8/2014 | |
| KR | 10-2017-0016710 A | 2/2017 | |
| KR | 10-2017-0065238 A | 6/2017 | |
| KR | 10-2017-0136878 A | 12/2017 | |
| KR | 10-2018-0022489 A | 3/2018 | |
| KR | 10-1965773 B1 | 4/2019 | |
| KR | 10-2019-0101179 A | 8/2019 | |
| WO | 2010/041907 A2 | 4/2010 | |
| WO | WO 2012/077653 A1 | 6/2012 | |
| WO | 2014/024473 A1 | 2/2014 | |
| WO | 2018/012821 A1 | 1/2018 | |
| WO | 2019/016395 A1 | 1/2019 | |

OTHER PUBLICATIONS

EPO Extended Search Report dated Jan. 24, 2020, for corresponding European Patent Application No. 19195631.7 (10 pages).
EPO Office Action dated Nov. 12, 2020 issued in corresponding EP Application No. 19195631.7, 5 pages.
Korean Office Action dated Jan. 29, 2021, issued in corresponding Korean Patent Application No. 10-2018-0106955 (5 pages).
EPO Extended European Search Report dated Jul. 29, 2021, issued in European Patent Application No. 21160330.3 (9 pages).
EPO Extended European Search Report dated Jul. 30, 2021, issued in European Patent Application No. 21160335.2 (10 pages).
Gong Jinbao, et al., "Study on Carbon Materials for Anodes of Lithium-Ion Batteries," Journal of Fudan University (Natural Science), vol. 43, No. 4, Aug. 2004, 7 pages.
Chinese Office Action dated Dec. 1, 2021, issued in corresponding Chinese Patent Application No. 201910841285.4 (10 pages).

* cited by examiner

NEGATIVE ACTIVE MATERIAL FOR RECHARGEABLE LITHIUM BATTERY, METHOD FOR PREPARING SAME, NEGATIVE ELECTRODE INCLUDING THE SAME AND RECHARGEABLE LITHIUM BATTERY INCLUDING SAME

CROSS-REFERENCE TO RELATED APPLICATION

This application claims priority to and the benefit of Korean Patent Application No. 10-2018-0106955 filed in the Korean Intellectual Property Office on Sep. 7, 2018, the entire content of which is incorporated herein by reference.

BACKGROUND

1. Field

One or more aspects of example embodiments of the present disclosure are related to a negative active material for a rechargeable lithium battery, a method for preparing the same, and a negative electrode and a rechargeable lithium battery including the same.

2. Description of the Related Art

Ongoing efforts to develop rechargeable lithium batteries with high capacity are being driven by an increasing demand for mobile devices with portable batteries.

Lithium-transition metal oxides having a structure capable of intercalating lithium ions (such as $LiCoO_2$, $LiMn_2O_4$, $LiNi_{1-x}Co_xO_2$ ($0 \leq x < 1$), and/or the like) have been used as positive active materials for rechargeable lithium batteries.

Various types of carbon-based materials capable of intercalating and deintercalating lithium, including artificial graphite, natural graphite, and hard carbon, and Si-based active materials including Si and Sn, have been used as negative active materials for rechargeable lithium batteries.

SUMMARY

One or more aspects of embodiments of the present disclosure are directed toward a negative active material for a rechargeable lithium battery with improved cycle-life characteristics, which exhibits decreased thickness expansion during use, due to a reduction in side reactions with an electrolyte solution.

One or more aspects of embodiments of the present disclosure are directed toward a method for preparing the negative active material.

One or more aspects of embodiments of the present disclosure are directed toward a negative electrode including the negative active material.

One or more aspects of embodiments of the present disclosure are directed toward a rechargeable lithium battery including the negative electrode.

One or more example embodiments of the present disclosure provide a negative active material for a rechargeable lithium battery including: natural graphite including a plurality of primary particles assembled into a spheroidal secondary particle; amorphous carbon, a first portion of the amorphous carbon being on the surface of the plurality of primary particles, internal to the secondary particle; and a second portion of the amorphous carbon included within a coating layer surrounding the secondary particle, the plurality of primary particles having an average particle diameter of about 5 µm to about 15 µm, the secondary particle having an average particle diameter of about 8 µm to about 24 µm, and a peak intensity ratio I(002)/I(110) of the negative active material being less than or equal to about 120, as measured by X-ray diffraction.

The natural graphite may be flake-shaped natural graphite.

The negative active material may have a pore volume fraction of less than or equal to about 2%.

The negative active material may have a pore volume fraction of about 1.0% to about 1.5%.

The coating layer may have a thickness of about 5 nm to about 50 nm.

The negative active material may have a specific surface area (BET surface area) of less than or equal to about 10 $m^2/g$.

The negative active material may have tap density of about 0.7 g/cc to about 1.3 g/cc.

The negative active material may include the natural graphite and the amorphous carbon in a weight ratio of about 90:10 to about 75:25.

The amorphous carbon may be selected from soft carbons, hard carbons, mesophase pitch carbonized products, fired cokes, and mixtures thereof.

One or more example embodiments of the present disclosure provide a method of preparing the negative active material for a rechargeable lithium battery including: pulverizing a natural graphite raw material into a plurality of primary particles having a small particle size; assembling the plurality of primary particles into the spheroidal secondary particle; adding an amorphous carbon precursor to the secondary particle to prepare a mixture; and heat-treating the mixture.

The natural graphite raw material may have an average particle diameter of about 80 µm to about 140 µm, the primary particles may have an average particle diameter of about 5 µm to about 15 µm, and the secondary particles may have an average particle diameter of about 8 µm to about 24 µm.

The negative active material may include the natural graphite and the amorphous carbon in a weight ratio of about 90:10 to about 75:25.

The amorphous carbon precursor may be selected from phenolic resins, furan resins, epoxy resins, polyacrylonitriles, polyamide resins, polyimide resins, polyamideimide resins, synthetic pitches, petroleum-based pitches, coal-based pitches, tars, and combinations thereof.

The heat-treating may be performed by maintaining the mixture in a furnace at about 1,000° C. to about 2,000° C. for about 1 hour to about 5 hours.

One or more example embodiments of the present disclosure provide a negative electrode including the negative active material.

One or more example embodiments of the present disclosure provide a rechargeable lithium battery including the negative electrode, a positive electrode including a positive active material, and an electrolyte.

By reducing the internal pore volume and reducing side reactions with electrolyte, expansion of the negative active material may be suppressed or reduced, and cycle-life characteristics may be improved.

DETAILED DESCRIPTION

Hereinafter, embodiments of the present disclosure are described in more detail, examples of which are illustrated in the accompanying drawings, wherein like reference numerals refer to like elements throughout and duplicative descriptions thereof may not be provided. However, these embodiments are examples, the present disclosure is not limited thereto, and the present disclosure is defined by the scope of claims. Accordingly, the example embodiments are merely described below, by referring to the figures, to explain aspects of the present description.

The thicknesses of layers, films, panels, regions, etc., may be exaggerated in the drawings for clarity. It will be understood that when an element such as a layer, film, region, or substrate is referred to as being "on" another element, it can be directly on the other element or intervening element(s) may also be present. In contrast, when an element is referred to as being "directly on" another element, no intervening elements are present.

Expressions such as "at least one of", "one of", "selected from", "at least one selected from", and "one selected from", when preceding a list of elements, modify the entire list of elements and do not modify the individual elements of the list. Further, the use of "may" when describing embodiments of the present disclosure refers to "one or more embodiments of the present disclosure."

Figure 1A:
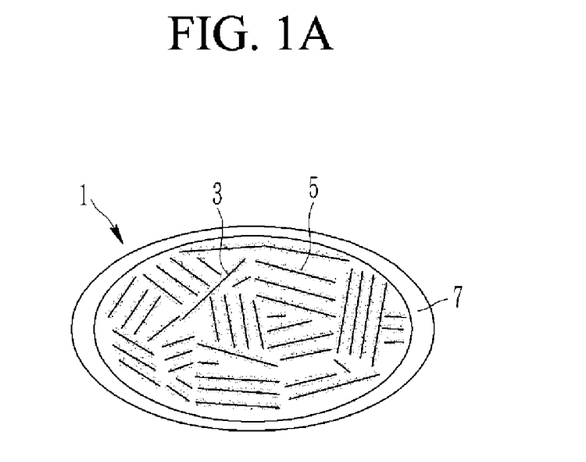
FIG. 1A is a schematic view of a secondary particle of a negative active material according to an embodiment of the present disclosure.

Hereinafter, a negative active material according to an embodiment of the present disclosure is described with reference to FIG. 1A. FIG. 1A is a schematic view of a secondary particle of a negative active material according to an embodiment of the present disclosure.

The negative active material includes natural graphite including a plurality of secondary particles 1 in which a plurality of primary particles 3 are assembled; (first) amorphous carbon 5 on the surface of the primary particles 3; and a coating layer 7 including additional (second) amorphous carbon surrounding the secondary particles 1, wherein the primary particles 3 have an average particle diameter of about 5 μm to about 15 μm, the secondary particles 1 have an average particle diameter of about 8 μm to about 24 μm, and the negative active material has a peak intensity ratio I(002)/I(110) less than or equal to about 120, as measured by X-ray diffraction.

Graphite has been widely used as a negative active material. For example, natural graphite has a high crystallinity, so it may provide an ideal capacity close to the theoretical capacity, compared with artificial graphite. A negative active material may be obtained by providing the natural graphite in a high density.

Figure 1B:
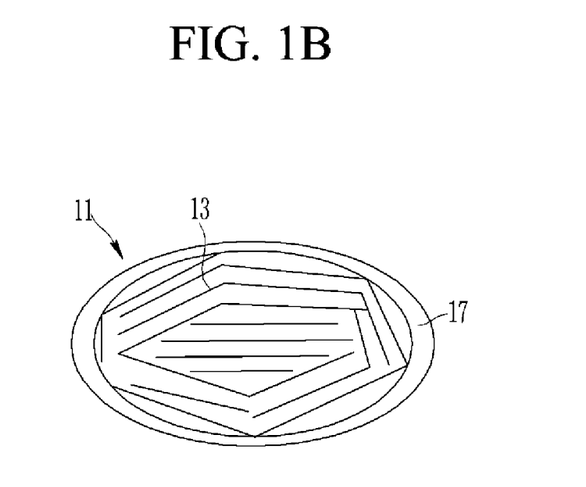
FIG. 1B is a schematic view of a secondary particle of conventional negative active material.

In the related art, as shown in FIG. 1B, natural graphite 13 is generally formed with large-sized particles having an average particle diameter of about 40 μm to about 120 μm, which are subjected to a spheroidizing process. In the related art case of a negative active material including the spheroidized natural graphite secondary particle 11 and an amorphous carbon coating layer 17 on a surface of the secondary particle 11, the internal structure is not sufficiently dense, so residual stress may occur during charging and discharging of the rechargeable lithium battery, causing unwanted expansion of the negative active material. As such, the internal pore volume of the negative active material may increase, and side reaction(s) with electrolyte may increase, so that the rechargeable lithium battery may be deformed, and the cycle-life of the battery may be deteriorated.

As used herein, the terms "spheroidal", "spheroidized", "spheroidizing process", and related terms refer to a state or process in which primary particles are agglomerated into a larger secondary particle (mass) having a substantially spheroidal, spherical, or ellipsoidal shape. The shape and form of the constituent primary particles is not particularly limited, and it will be understood that the term "spheroidal" does not necessarily apply to the constituent primary particles. For example, the primary particles may have the shape or form of needles, flakes, plates, cylinders, fibers, tetragons, cubes, prisms, spheres, ellipsoids, any polyhedron, or any combination thereof.

According to an embodiment of the present disclosure, by pulverizing natural graphite to within the above-described average primary particle diameter and spheroidizing the secondary particles (e.g., forming spherical secondary particles) formed of assembled primary particles, a negative active material may be obtained in which cycle-life characteristics are improved, internal expansion is decreased, and the high capacity characteristics of the natural graphite are maintained.

The primary particles may have an average particle diameter of about 5 μm to about 15 μm, and the secondary particle may have an average particle diameter of about 8 μm to about 24 μm. When the primary particle has an average particle diameter of less than about 5 μm, the production yield of the particle may be decreased, and the cycle-life characteristics of the battery may be deteriorated. Further, when the primary particle has an average particle diameter of greater than 15 μm, the resulting secondary particles may become too large to be applied in a rechargeable lithium battery. In addition, when the secondary particle has an average particle diameter of less than about 8 μm, pores formed during electrode production may be excessively small, and electrolyte impregnation may be deteriorated in the battery. Further, when the secondary particle has an average diameter greater than about 24 μm, a thickness of the negative electrode may be too thick to be applied in the battery.

In some embodiments, the primary particles may have an average particle diameter of about 5 μm to about 15 μm, for example, about 5 μm to about 13 μm, about 5 μm to about 12 μm, or about 5.5 μm to about 11.5 μm; and the secondary particle may have an average particle diameter of about 8 μm to about 24 μm, for example, about 10 μm to about 24 μm, about 11 μm to about 24 μm, about 12 μm to about 24 μm, about 13 μm to about 24 μm, about 13 μm to about 23 μm, or about 13 μm to about 20 μm. When the primary particles and the secondary particles have average particle diameters within the above-described ranges, expansion of the negative active material may be more effectively suppressed, and a tap density of the negative active material may be enhanced or increased.

As used herein, the term "particle diameter", for example, when used to describe the primary particles and the secondary particles, may refer to an average particle diameter, for example, the average length of the longest dimension of the particles. In some embodiments, when the primary particles have a needle or flake shape, the particle diameter may be interchangeably referred to as the average particle length. The average particle diameter may be measured for a plurality of particles in a particle diameter analyzer, and may be the same as the particle diameter of a particle at 50 volume % (D50) in a cumulative particle size-distribution curve.

The secondary particle may be formed by assembling a plurality of primary particles. The number of the assembled primary particles is not particularly limited, and the secondary particle may be formed as an assembly of, for example, about 2 to about 50, about 2 to about 40, about 2 to about 30, about 2 to about 20, about 2 to about 10, or about 2 to about 4 primary particles.

The natural graphite may be flake-shaped (e.g., needle shape, scale shape, and/or flake type) natural graphite. In some embodiments, for example, the primary particles may have a flake (needle, scale, and/or flake) shape.

According to an embodiment, the negative active material includes a coating layer (e.g., a first coating layer) including amorphous carbon on the surface of the primary particles, and amorphous carbon (e.g., a second coating layer including amorphous carbon) surrounding the secondary particles. For example, the negative active material includes amorphous carbon, where a first portion of the amorphous carbon is on a surface of the plurality of primary particles, internal to the secondary particle; and a second portion of the amorphous carbon is included within a coating layer comprising additional amorphous carbon surrounding the secondary particle. A pore volume fraction in the secondary particle may be decreased, and side reaction(s) with electrolyte may be suppressed by adding/coating amorphous carbon on a surface of the primary particles of natural graphite (e.g., inside or within the interior of secondary particles), as well as on a surface of the secondary particles. The charge and discharge rate capability of a battery may thereby be improved.

The negative active material may include the natural graphite and the amorphous carbon at a weight ratio of about 90:10 to about 75:25, for example, at a weight ratio of about 90:10 to about 80:20, about 90:10 to about 85:15, or about 90:10 to about 88:12. Within the above-described range, side reaction(s) with electrolyte may be more effectively suppressed, and the charge and discharge rate capability of a battery may be improved.

The coating layer including amorphous carbon surrounding the secondary particles may have a thickness of about 5 nm to about 50 nm, for example, about 10 nm to about 50 nm, or about 20 nm to about 50 nm. Within the above-described range, side reaction(s) with electrolyte may be more effectively suppressed or reduced, and the charge and discharge rate capability may be improved.

The amorphous carbon may be one selected from soft carbons, hard carbons, mesophase pitch carbonized products, fired cokes, and mixtures thereof.

The amorphous carbon in the coating layer may be the same as the amorphous carbon on the surface of the primary particles. For example, the amorphous carbon in the coating layer may provide (e.g., be the source of) the amorphous carbon that is present on the surface of the primary particles, as further described below.

The negative active material according to an embodiment of the present disclosure may have a peak intensity ratio I(002)/I(110) of less than or equal to about 120, for example, less than or equal to about 110, less than or equal to about 105, or less than or equal to about 100, as measured by X-ray diffraction (XRD).

The peak intensity ratio I(002)/I(110) refers to a ratio of the peak intensity I(002) arising from diffraction by the (002) crystal planes to the peak intensity I(110) arising from diffraction by the (110) crystal planes of the negative active material, as measured by X-ray diffraction. The peak intensity ratio is an index relating to or describing the orientation of negative active material particles in the negative active material layer. As the peak intensity ratio I(002)/I(110) decreases, an increasing number of the negative active material crystal particles have a random orientation, but as the peak intensity ratio I(002)/I(110) increases, an increasing number of the crystal particles have an alignment parallel to the negative active material layer. In other words, as the peak intensity ratio decreases, the edge surface of the natural graphite is oriented or aligned in a random direction, and random-orientation of the negative active material may be increased. Thereby, intercalation/deintercalation of lithium ions into natural graphite secondary particles may be better facilitated, so as to improve the capacity characteristics and the charge and discharge rate capability of a rechargeable lithium battery employing the same.

According to an embodiment of the present disclosure, a negative active material may be obtained using natural graphite particles in which the crystal particles are isotropically grown, pulverizing the natural graphite to form primary particles, and then assembling the primary particles into secondary particles. The method may effectively suppress or reduce the degree of parallel alignment of negative active material crystal particles when manufacturing a negative electrode.

When the peak intensity ratio I(002)/I(110) is within the above-described range, an expansion rate of the negative active material may be decreased. As a result, an internal pore volume of the negative active material and side reaction(s) with electrolyte may be decreased, so as to improve cycle-life characteristics of a battery.

An internal pore volume fraction of the negative active material may be less than or equal to about 2%, for example, less than or equal to about 1.8%, less than or equal to about 1.5%, about 1.0% to about 1.5%, or about 1.0% to about 1.3%. When the pore volume fraction of the negative active material is within the above-described range, the internal pore volume of the negative active material and side reaction(s) with electrolyte may be decreased, so as to improve cycle-life characteristics of a battery.

The pore volume fraction is measured as follows:

First, a rechargeable lithium battery that has already been charged and discharged (e.g., subjected to formation and/or cycled) is discharged, and then disassembled to separate the negative active material layer from the negative electrode. A binder, an organic material, and like materials included in the negative active material layer are removed, and the remainder is dried to provide the powdery negative active material including natural graphite and amorphous carbon. The pore volume of the negative active material is measured and then multiplied by the true (original) density of the natural graphite to provide an internal pore volume fraction (%) of the secondary particles. Here, the amorphous carbon on the surface of the natural graphite primary particles (inside of the secondary particles, e.g., on surfaces internal to the secondary particle) and on the surface of the secondary particles has the same original density as the natural graphite, and does not need to be removed to obtain an accurate calculation.

In this case, the negative active material may have a specific surface area (e.g., BET surface area) of less than or equal to about 10 m$^2$/g, for example, less than or equal to about 8 m$^2$/g, less than or equal to about 6 m$^2$/g, or less than or equal to about 5 m$^2$/g. When the negative active material has the above-described specific surface area, the internal pore volume of the negative active material and side reaction(s) with electrolyte may be decreased, so as to improve the cycle-life characteristics of the battery.

The negative active material may have a tap density of about 0.7 g/cc to about 1.3 g/cc, for example, a tap density of about 0.9 g/cc to about 1.3 g/cc, or about 1.1 g/cc to about 1.3 g/cc. When the negative active material has the above-described tap density, the internal pore volume of the negative active material and side reaction(s) with electrolyte may be decreased, so as to improve cycle-life characteristics of a battery.

Hereinafter, a method of manufacturing the negative active material is described.

Natural graphite raw materials having an average particle diameter of greater than or equal to about 80 μm are pulverized into primary particles. The natural graphite raw materials may be pulverized into the primary particles using any suitable method, for example, an airstream grinding method. The airstream grinding may be performed by grinding the natural graphite under an airstream under conditions of about 5 kg/cm$^2$ to about 20 kg/cm$^2$ at room temperature (25° C.).

The primary particles may thus have an average particle diameter of about 5 to about 15 μm, for example, about 5 to about 13 μm, about 5 to about 12 μm, or about 5.5 to about 11.5 μm, so expansion of the negative active material using the same may more effectively suppressed or reduced, and a tap density of the negative active material may be enhanced.

Subsequently, a spheroidizing process is performed using any suitable spheroidizing equipment to assemble the small-size primary particles into secondary particles (e.g., substantially spheroidal secondary particles).

Thereby, expansion of the negative active material may be more effectively suppressed or reduced, and the tap density of the negative active material may be enhanced or increased.

Subsequently, a mixing process of adding an amorphous carbon precursor to the obtained natural graphite secondary particles is performed.

The amorphous carbon precursor is not particularly limited as long as it can be converted to a carbonized product, and for example, may be selected from phenolic resins, furan resins, epoxy resins, polyacrylonitriles, polyamide resins, polyimide resins, polyamideimide resins, synthetic pitches, petroleum-based pitches, coal-based pitches, tars, pitch carbon, and combinations thereof.

In the mixing process, the amorphous carbon precursor may be added to the natural graphite secondary particles by adjusting a weight ratio of the natural graphite and the amorphous carbon in the final product from about 90:10 to about 75:25, for example, in a weight ratio of about 90:10 to about 80:20, about 90:10 to about 85:15, or about 90:10 to about 88:12.

Thereby, an amount of amorphous carbon with respect to the secondary particles may be appropriately or suitably controlled, side reaction(s) with electrolyte may be reduced, and an inner density may be improved by decreasing the internal pore volume of the secondary particles. In addition, the coating layer having a thickness within the aforementioned range may be accomplished when the coating layer including amorphous carbon is formed on the surface of the secondary particles. The coating layer may help to provide the natural graphite secondary particles with structural stability, and may suppress the expansion of the negative active material. As a result, the cycle-life characteristics of the battery may be improved.

Subsequently, a negative active material according to an embodiment of the present disclosure is prepared by performing a heat-treatment process of firing the secondary particles mixed with the amorphous carbon.

The heat-treatment process may be maintained in a furnace at about 1,000° C. to about 2,000° C., for example, about 1,000° C. to about 1,800° C., about 1,000° C. to about 1,600° C., about 1,000° C. to about 1,400° C., or about 1,200° C. to about 1,300° C. for about 1 hour to about 5 hours, for example, for about 1 hour to about 4 hours, about 1 hour to about 3 hours, or about 2 hours to about 3 hours. When the heat-treatment process satisfies the above-described temperature range and the maintaining time range, the internal pore volume of the secondary particles and side reaction(s) with electrolyte may be reduced, and expansion of the negative active material may be suppressed. As the results, the cycle-life characteristics of the battery may be improved.

For example, during the heat-treatment process, the amorphous carbon on the surface of the secondary particle may penetrate into the interior of the secondary particle. For example, the amorphous carbon on the surface of the secondary particle may penetrate or diffuse between adjacent primary particles (e.g., along and/or between the primary particle surfaces and boundaries) to be deposited on surfaces of one or more primary particles. Further, the amorphous carbon may fill or at least partially fill any voids that may be present between primary particles within the spheroidized secondary particle, thereby reducing the internal pore volume of the secondary particle. For example the amorphous carbon may fill a plurality of voids at or near the surface of the secondary particle. In some embodiments, the internal pore volume may be decreased by 5% to 50%, for example, 10% to 40%, or 20% to 30%. In some embodiments, the amorphous carbon on surfaces of the primary particles may prevent or reduce infiltration of the electrolyte into the interior of the negative active material secondary particles.

Another embodiment of the present disclosure provides a negative electrode including the negative active material. The negative electrode includes a negative active material layer including the negative active material, and a current collector supporting the negative active material layer.

The negative active material may be included in the negative active material layer in an amount of about 95 wt % to about 99 wt % based on the total weight of the negative active material layer.

The binder may be included in the negative active material layer in an amount of about 1 wt % to about 5 wt % based on a total weight of the negative active material layer. When the conductive material is further included, about 90 wt % to about 98 wt % of the negative active material, about 1 wt % to about 5 wt % of the binder, and about 1 wt % to about 5 wt % of the conductive material may be used.

The binder acts to adhere negative active material particles to each other and to adhere the negative active material to the current collector. The binder may include a non-aqueous binder, an aqueous binder, or a combination thereof.

The non-aqueous binder may include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or any combination thereof.

The aqueous binder may be a styrene-butadiene rubber, an acrylated styrene-butadiene rubber (SBR), an acrylonitrile-butadiene rubber, an acrylic rubber, a butyl rubber, polypropylene, an ethylene propylene copolymer, polyepichlorohydrin, polyphosphazene, polyacrylonitrile, polystyrene, an ethylene propylene diene copolymer, polyvinylpyridine, chlorosulfonated polyethylene, a latex, a polyester resin, an acrylic resin, a phenolic resin, an epoxy resin, polyvinyl alcohol, or any combination thereof.

When the aqueous binder is used as the negative electrode binder, a cellulose-based compound may be additionally used to provide viscosity as a thickener. The cellulose-based compound may include one or more of carboxymethyl cellulose, hydroxypropylmethyl cellulose, methyl cellulose, and/or alkali metal salts thereof. The alkali metal may be sodium (Na), potassium (K), and/or lithium (Li). The cellulose-based compound may be included in an amount of about 0.1 parts by weight to about 3 parts by weight based on 100 parts by weight of the negative active material.

The conductive material is included to provide or increase electrode conductivity. Any electrically conductive material may be used as a conductive material unless it causes an unwanted chemical change. Non-limiting examples of the conductive material include a carbon-based material (such as natural graphite, artificial graphite, carbon black, acetylene black, ketjen black, a carbon fiber, and/or the like); a metal-based material of a metal powder and/or a metal fiber including copper, nickel, aluminum, silver, and/or the like; a conductive polymer (such as a polyphenylene derivative); and mixtures thereof.

The current collector may include one selected from a copper foil, a nickel foil, a stainless steel foil, a titanium foil, a nickel foam, a copper foam, a polymer substrate coated with a conductive metal, and combinations thereof.

Another embodiment of the present disclosure provides a rechargeable lithium battery including the negative electrode, a positive electrode including a positive active material, and an electrolyte solution with the negative electrode and the positive electrode.

The positive electrode may include a positive current collector and a positive active material layer formed on the positive current collector. The positive active material may include lithium intercalation compounds that can reversibly intercalate and deintercalate lithium ions. In some embodiments, the positive active material may be or include one or more composite oxides of a metal (selected from cobalt, manganese, nickel, and combinations thereof), and lithium. In some embodiments, the positive active material may be represented by one of the following chemical formulae: $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0 \leq e \leq 0.1$); $Li_aNi_bCo_cAl_dG_eO_2$ ($0.90 \leq a \leq 1.8$, $0 \leq b \leq 0.9$, $0 \leq c \leq 0.5$, $0 \leq d \leq 0.5$, $0 \leq e \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $Li_aFePO_4$ ($0.90 \leq a \leq 1.8$).

In the above chemical formulae, A is selected from nickel (Ni), cobalt (Co), manganese (Mn), and combinations thereof; X is selected from aluminum (Al), Ni, Co, Mn, chromium (Cr), iron (Fe), magnesium (Mg), strontium (Sr), vanadium (V), a rare earth element, and combinations thereof; D is selected from oxygen (O), fluorine (F), sulfur (S), phosphorus (P), and combinations thereof; E is selected from Co, Mn, and combinations thereof; T is selected from F, S, P, and combinations thereof; G is selected from Al, Cr, Mn, Fe, Mg, lanthanum (La), cerium (Ce), strontium (Sr), vanadium (V), and combinations thereof; Q is selected from titanium (Ti), molybdenum (Mo), Mn, and combinations thereof; Z is selected from Cr, V, Fe, Sc, yttrium (Y), and combinations thereof; and J is selected from V, Cr, Mn, Co, Ni, copper (Cu), and combinations thereof.

The compounds may have a coating layer on the surface, or may be mixed with another compound having a coating layer on its surface. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous and/or crystalline. The coating element included in the coating layer may include Mg, Al, Co, K, Na, calcium (Ca), silicon (Si), Ti, V, tin (Sn), germanium (Ge), gallium (Ga), boron (B), arsenic (As), zirconium (Zr), or any mixture thereof. The coating layer may be applied using any suitable method having no adverse influence on the properties of a positive active material including these elements. For example, the method may include any suitable coating method (such as spray coating, dipping, and/or the like).

A content of the positive active material in the positive electrode may be about 90 wt % to about 98 wt % based on the total weight of the positive active material layer.

In an embodiment of the present disclosure, the positive active material layer may further include a binder and a conductive material. Herein, the amounts of the binder and the conductive material may each be about 1 wt % to about 5 wt % based on the total weight of the positive active material layer.

The binder serves to attach positive active material particles to each other, and to attach the positive active material to the current collector. Non-limiting examples thereof include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material is included to provide electrode conductivity. Any electrically conductive material may be used as a conductive material unless it causes an unwanted chemical change. Non-limiting examples of the conductive material include a carbon-based material (such as natural graphite, artificial graphite, carbon black, acetylene black, ketjen black, carbon fiber and/or the like); a metal-based material of a metal powder and/or a metal fiber including copper, nickel, aluminum, silver, and/or the like; a conductive polymer (such as a polyphenylene derivative); and mixtures/combinations thereof.

The current collector may include Al, but embodiments of the present disclosure are not limited thereto.

The electrolyte includes a non-aqueous organic solvent and a lithium salt.

The non-aqueous organic solvent serves as a medium for transporting ions taking part in the electrochemical reaction of a battery.

The non-aqueous organic solvent may include a carbonate-based, ester-based, ether-based, ketone-based, alcohol-based, and/or aprotic solvent.

The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethylacetate, methylpropionate, ethylpropionate, decanolide, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like. The ketone-based solvent includes cyclohexanone and/or the like. The alcohol-based solvent includes ethyl alcohol, isopropyl alcohol, and/or the like, and non-limiting examples of the aprotic solvent include nitriles (such as R—CN, where R is a C2 to C20 linear, branched, and/or cyclic hydrocarbon including a double bond, an aromatic ring, or an ether bond), amides (such as dimethylformamide), dioxolanes (such as 1,3-dioxolane), sulfolanes, and the like.

The organic solvent may be used alone (e.g., as a single solvent) or in a mixture (e.g., as a mixture of solvents). When the organic solvent is used in a mixture, the mixture ratio may be selected in accordance with desired battery performance, as ascertained by a person having ordinary skill in the art.

The carbonate-based solvent may include a mixture of a cyclic carbonate and a chain-type carbonate. When the cyclic carbonate and the chain-type carbonate are mixed together in a volume ratio of about 1:1 to about 1:9, performance of the electrolyte solution may be enhanced.

The organic solvent may further include an aromatic hydrocarbon-based organic solvent in addition to the carbonate-based solvent. Herein, the carbonate-based solvent and the aromatic hydrocarbon-based organic solvent may be mixed in a volume ratio of about 1:1 to about 30:1.

The aromatic hydrocarbon-based organic solvent may be an aromatic hydrocarbon-based compound of Chemical Formula 1:

Chemical Formula 1

In Chemical Formula 1, $R_1$ to $R_6$ may be the same or different and may each independently be selected from hydrogen, a halogen, a C1 to C10 alkyl group, a haloalkyl group, and combinations thereof.

Non-limiting examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The electrolyte may further include an additive of vinylene carbonate or an ethylene carbonate-based compound of Chemical Formula 2 in order to improve the cycle-life of the battery:

Chemical Formula 2

In Chemical Formula 2, $R_7$ and $R_8$ may be the same or different and may each independently be selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not simultaneously (e.g., concurrently) hydrogen.

Non-limiting examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of the additive for improving a cycle-life may be used within any appropriate or suitable range.

The lithium salt dissolved in an organic solvent supplies a battery with lithium ions, facilitates basic operation of the rechargeable lithium battery, and improves lithium ion transport between the positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers, for example an integer from 1 to 20), LiCl, LiI, and $LiB(C_2O_4)_2$ (lithium bis(oxalato) borate, LiBOB). A concentration of the lithium salt may range from about 0.1 M to about 2.0 M. When the lithium salt is included in the above concentration range, the electrolyte may have excellent performance and lithium ion mobility due to desired or optimal electrolyte conductivity and viscosity.

The rechargeable lithium battery may further include a separator between the negative electrode and the positive electrode, depending on the type or kind of battery. Non-limiting examples of a suitable separator material include polyethylene, polypropylene, polyvinylidene fluoride, and multi-layer combinations thereof (such as a polyethylene/polypropylene double-layered separator, a polyethylene/polypropylene/polyethylene triple-layered separator, and/or a polypropylene/polyethylene/polypropylene triple-layered separator).

Figure 2:
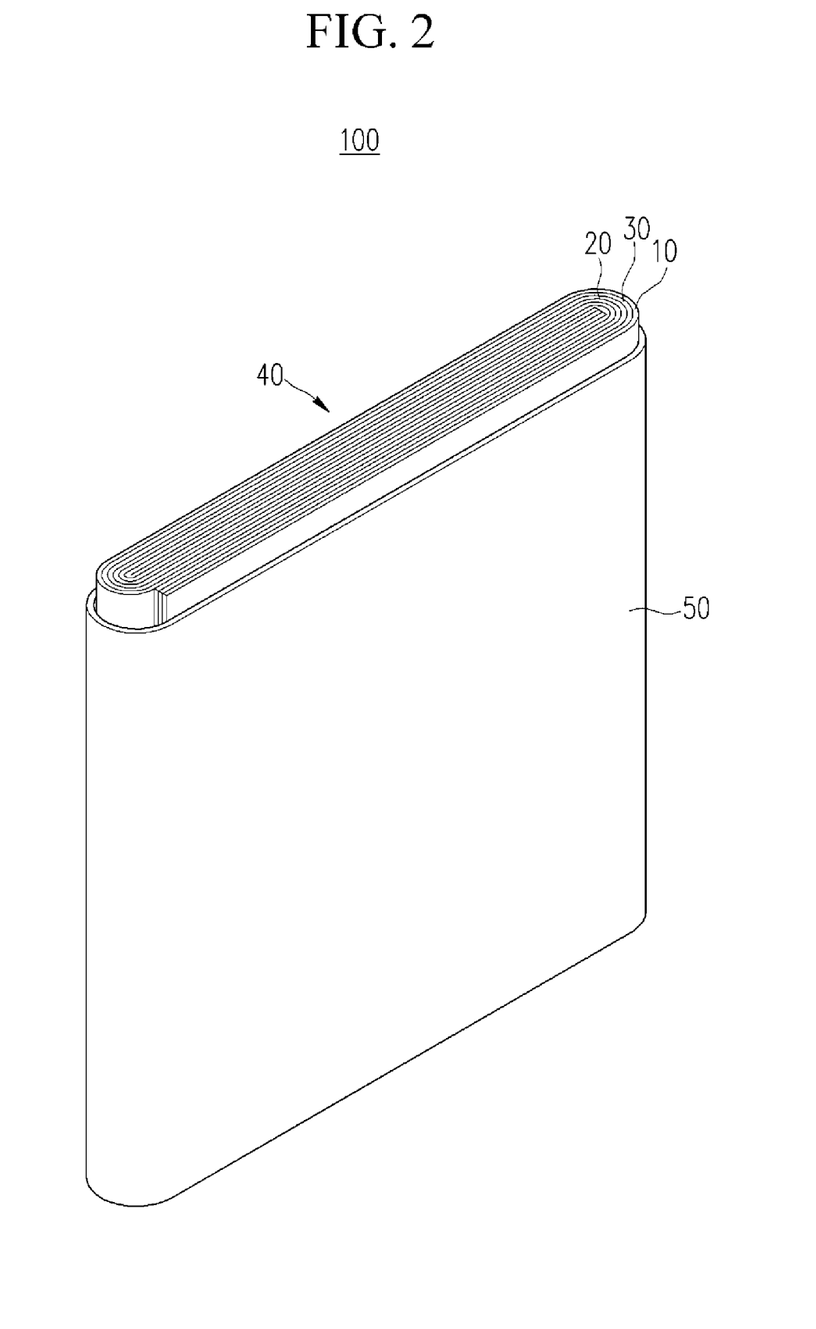
FIG. 2 is a schematic view showing a structure of an example rechargeable lithium battery according to an embodiment of the present disclosure.

FIG. 2 is an exploded perspective view of a rechargeable lithium battery according to an embodiment of the present disclosure. The rechargeable lithium battery is illustrated as a prismatic battery, but embodiments of the present disclosure are not limited thereto, and may include variously-shaped batteries (such as a cylindrical battery, a pouch battery, and/or the like).

Referring to FIG. 2, a rechargeable lithium battery 100 according to an embodiment of the present disclosure includes an electrode assembly 40, manufactured by winding a separator 30 interposed between a positive electrode 10 and a negative electrode 20, and a case 50 housing the electrode assembly 40. An electrolyte may be impregnated in the positive electrode 10, the negative electrode 20, and the separator 30.

Hereinafter, example embodiments of the present disclosure and comparative examples are described. These examples, however, are not in any sense to be interpreted as limiting the scope of the disclosure.

Example 1

A graphite raw material having an average particle diameter of greater than or equal to about 80 μm was grinded to small-size primary particles by airstream grinding. The small-size primary particles were processed to secondary particles using spheroidizing equipment. Pitch carbon was added to the secondary particles and heat-treated in a furnace at 1,200° C. for 2 hours to provide a negative active material. In this case, the added amount of the pitch carbon was adjusted to be corresponded to a weight ratio of graphite/amorphous carbon of the obtained negative active material.

The kind of graphite, the size of the primary particle, the size of the secondary particle, the peak intensity ratio of I(002)/I(110), the weight ratio of graphite/amorphous carbon in the negative active material, and the thickness of the amorphous carbon coating layer of the secondary particle surface are each shown in Table 1.

97.5 wt % of the negative active material, 1.0 wt % of carboxymethyl cellulose, and 1.5 wt % of styrene-butadiene were mixed in distilled water to provide a negative active material slurry composition.

The negative active material slurry composition was coated on a Cu current collector, dried, and then compressed to provide a negative electrode.

A half-cell was manufactured using the negative electrode, a lithium metal counter electrode, and an electrolyte solution. The electrolyte solution was prepared by dissolving 1M $LiPF_6$ in a mixed solvent of ethylene carbonate and dimethyl carbonate (a volume ratio of 3:7).

Examples 2 to 4 and Comparative Examples 2 to 5

Additional negative active materials, negative electrodes, and half-cells were manufactured in accordance with substantially the same procedure as in Example 1, except that the graphite, the size of the primary particles, the size of the secondary particles, the peak intensity ratio of I(002)/I(110), the weight ratio of graphite/amorphous carbon of the obtained negative active material, and the thickness of the amorphous carbon coating layer of the secondary particle surface were changed as shown in Table 1.

Comparative Example 1

A negative active material, a negative electrode, and a half-cell were manufactured in accordance with substantially the same procedure as in Example 1, except that a graphite raw material having an average particle diameter of 80 μm or more was processed using a spheroidizing equipment to directly provide secondary particles, and the graphite, the size of the primary particles, the size of the secondary particles, the peak intensity ratio of I(002)/I(110), the weight ratio of graphite/amorphous carbon of the obtained negative active material, and the thickness of the amorphous carbon coating layer of the secondary particle surface were changed as shown in Table 1.

TABLE 1

|  | Type of graphite | Particle diameter of primary particles (μm) | Particle diameter of secondary particles (μm) | I(002)/I(110) peak intensity ratio | Wt % ratio (graphite/amorphous carbon) | Thickness of amorphous carbon coating layer (nm) |
| --- | --- | --- | --- | --- | --- | --- |
| Example 1 | natural graphite | 7.0 | 15.6 | 120 | 90/10 | 23 |
| Example 2 | natural graphite | 5.8 | 13.1 | 118 | 85/15 | 11 |
| Example 3 | natural graphite | 8.2 | 17.3 | 107 | 75/25 | 48 |
| Example 4 | natural graphite | 11.5 | 19.7 | 98 | 80/20 | 26 |
| Comparative Example 1 | natural graphite | — | 11.3 | 161 | 95/5 | 27 |
| Comparative Example 2 | artificial graphite | 12.8 | 27.2 | 177 | 95/5 | 68 |
| Comparative Example 3 | artificial graphite | 10.8 | 25.8 | 142 | 70/30 | 11 |
| Comparative Example 4 | artificial graphite | 9.7 | 24.0 | 118 | 93/7 | 16 |
| Comparative Example 5 | natural graphite | 16.3 | 29.7 | 134 | 70/30 | 77 |

Evaluation Example 1: Measurement of Thickness Expansion Rate of Half-Cell

The half cells obtained from Examples 1 to 4 and Comparative Examples 1 to 5 were charged and discharged at 45° C. and 0.5 C for 25 cycles. A difference in the battery thickness before and after the charge and discharge was obtained, and a thickness increase rate was calculated according to Equation 1. The results are shown in Table 2.

Thickness increase rate (%)={(half-cell thickness after charge and discharge−half-cell thickness before charge and discharge)/half-cell thickness before charge and discharge}*100   Equation 1

Evaluation Example 2: Evaluation of Rate Capability

The half-cells obtained from Examples 1 to 4 and Comparative Examples 1 to 5 were charged and discharged at 0.1 C for the first cycle (1$^{st}$ cycle), charged and discharged at 0.2 C for the second cycle (2$^{nd}$ cycle), and then the 0.2 C charge capacity was measured. Then, the half-cells were charged at 2.0 C with 0.01 V cut-off, charged with 0.01 C cut-off under constant voltage, and then discharged at a 0.2 C constant current with 1.5 V cut-off. The 2 C charge capacity/0.2 C charge capacity was obtained to evaluate the rate capability. The results are shown in Table 2.

Evaluation Example 3: Measurement of Pore Volume Fraction (%)

After disassembling the half-cell which had been charged and discharged for the initial first cycle according to Evaluation Example 2, the negative active material portion was separated from the electrode, and a binder and an organic material were removed therefrom to prepare a dried powdery sample for a Brunauer-Emmett-Teller (BET) surface area analysis. The pore volume fraction (%) was calculated by multiplying a Barrett, Joyner, and Halenda (BJH) desorption cumulative pore volume value measured using BET equipment (ASAP 2020 V3.03 H) by a true density of the natural graphite. The results are shown in Table 2.

Evaluation Example 4: Evaluation of High Temperature Cycle-life Characteristics

The half-cells obtained from Examples 1 to 4 and Comparative Examples 1 to 5 were charged and discharged at 45° C. at 1.5 C for 50 cycles. A ratio of the 50$^{th}$ discharge capacity to the first discharge capacity was obtained, and the results are shown in Table 2.

TABLE 2

| | Thickness expansion ratio (%) of half-cell | Pore volume fraction (%) | Rate capability (2 C/0.2 C) (%) | High temperature cycle-life (45° C., 50th cycle) (%) |
| --- | --- | --- | --- | --- |
| Example 1 | 5.9 | 1.0 | 40.1 | 91.3 |
| Example 2 | 6.1 | 1.3 | 38.6 | 90.7 |
| Example 3 | 5.7 | 1.1 | 41.4 | 91.4 |
| Example 4 | 4.7 | 1.0 | 44.3 | 90.1 |
| Comparative Example 1 | 7.5 | 3.5 | 24.2 | 88.7 |
| Comparative Example 2 | 6.3 | 1.2 | 23.0 | 87.5 |
| Comparative Example 3 | 10.4 | 5.6 | 28.9 | 87.2 |
| Comparative Example 4 | 7.7 | 4.2 | 35.1 | 88.1 |
| Comparative Example 5 | 6.7 | 1.8 | 22.7 | 86.3 |

Referring to Table 2, in each of Examples 1 to 4 using natural graphite having an average primary particle diameter of 5 μm to 15 μm, an average secondary particle diameter of 8 μm to 24 μm, and a peak intensity ratio I(002)/I(110) of less than or equal to 120, the thickness expansion ratio was low (4.7 to 6.1%), the initial rate capability was greater than or equal to 38%, and the high temperature cycle-life characteristics were significantly high (greater than or equal to 90%). In addition, the pore volume fraction in the negative active material was decreased to less than or equal to 1.3%.

On the other hand, although Comparative Examples 1 and 5 used natural graphite, the results were unsatisfactory, as those was not pulverized to the small-size primary particles. For example, the peak intensity ratio I(002)/I(110) was greater than 120 in Comparative Example 1, and the thickness expansion ratio was as high as 7.5%, the initial rate capability was as low as 24.2%, the high temperature cycle-life characteristics were as low as 88.7%, and the pore volume fraction in the negative active material was as high as 3.5%. In addition, in Comparative Example 5 (using primary particles and secondary particles having average particle diameters of greater than 15 μm and 24 μm, respectively), the I(002)/I(110) peak intensity ratio thereof was greater than 120, the initial charge and discharge rate capability was as low as 22.7%, and the high temperature cycle-life characteristics were as low as 86.3%.

Furthermore, in Comparative Examples 2 to 4 using artificial graphite instead of natural graphite, for example, Comparative Example 4, the thickness expansion ratio of the battery cell was as high as 7.7%, and high temperature cycle-life characteristics were as low as 88.1%. In Comparative Example 2 using artificial graphite and including secondary particles with an average particle diameter of greater than 24 μm, it was confirmed that the thickness expansion ratio of the battery was high, and the rate capability and the high temperature cycle-life characteristics were deteriorated. In addition, in Comparative Example 3 using artificial graphite and including the secondary particles having an average particle diameter of greater than 24 μm, the peak intensity ratio of I(002)/I(110) was greater than 120, the pore volume fraction and the thickness expansion ratio were the highest, and the high temperature cycle-life characteristics of the battery was low.

As used herein, the terms "use", "using", and "used" may be considered synonymous with the terms "utilize", "utilizing", and "utilized", respectively. As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims and equivalents thereof.

DESCRIPTION OF SOME OF THE SYMBOLS

| | |
|---|---|
| 1: secondary particle | 3: primary particle |
| 5: amorphous carbon | 7: coating layer |
| 11: secondary particle | 13: natural graphite |
| 17: coating layer | |
| 10: positive electrode | 20: negative electrode |
| 30: separator | 40: electrode assembly |
| 50: case | 100: rechargeable lithium battery |

What is claimed is:

1. A negative active material for a rechargeable lithium battery, comprising: natural graphite comprising a plurality of primary particles assembled into a spheroidal secondary particle; and amorphous carbon, a first portion of the amorphous carbon being on a surface of the plurality of primary particles, internal to the secondary particle and a second portion of the amorphous carbon comprised within a coating layer surrounding the secondary particle, the plurality of primary particles having an average particle diameter of about 5 μm to about 15 μm, the secondary particle having an average particle diameter of about 8 μm to about 24 μm, and a peak intensity ratio, I(002)/I(110), of the negative active material being less than or equal to about 120, as measured by X-ray diffraction, wherein the negative active material has a pore volume fraction of less than or equal to about 2%, and wherein the negative active material has a tap density of about 0.7 g/cc to about 1.3 g/cc.

2. The negative active material of claim 1, wherein the natural graphite is flake-shaped natural graphite.

3. The negative active material of claim 1, wherein the negative active material has a pore volume fraction of about 1.0% to about 1.5%.

4. The negative active material of claim 1, wherein the coating layer has a thickness of about 5 nm to about 50 nm.

5. The negative active material of claim 1, wherein the negative active material has a specific surface area (BET) of less than or equal to about 10 m$^2$/g.

6. The negative active material of claim 1, wherein the negative active material comprises the natural graphite and the amorphous carbon in a weight ratio of about 90:10 to about 75:25.

7. The negative active material of claim 1, wherein the amorphous carbon is one selected from soft carbons, hard carbons, mesophase pitch carbonized products, fired cokes, and mixtures thereof.

8. A method of preparing the negative active material of claim 1, the method comprising:
pulverizing natural graphite raw materials into the plurality of primary particles;
assembling the plurality of primary particles into the spheroidal secondary particle;
adding an amorphous carbon precursor to the secondary particle to prepare a mixture; and
heat-treating the mixture to prepare the negative active material.

9. The method of claim 8, wherein:
the natural graphite raw materials have an average particle diameter of about 80 μm to about 140 μm,
the primary particles have an average particle diameter of about 5 μm to about 15 μm, and
the secondary particle having an average particle diameter of about 8 μm to about 24 μm.

10. The method of claim 8, wherein the negative active material comprises the natural graphite and the amorphous carbon in a weight ratio of about 90:10 to about 75:25.

11. The method of claim 8, wherein the amorphous carbon precursor is one selected from phenolic resins, furan resins, epoxy resins, polyacrylonitriles, polyimide resins, polyimide resins, polyamideimide resins, synthetic pitches, petroleum-based pitches, coal-based pitches, tars, pitch carbon and combinations thereof.

12. The method of claim 8, wherein the heat-treating is performed by maintaining the mixture in a furnace of about 1,000° C. to about 2,000° C. for about 1 hour to about 5 hours.

13. A negative electrode comprising the negative active material of claim 1.

14. A rechargeable lithium battery comprising:
the negative electrode of claim 13;
a positive electrode comprising a positive active material; and
an electrolyte with the negative electrode and the positive electrode.

15. The negative active material of claim 1, wherein the plurality of primary particles have an average particle diameter of about 5.5 μm to about 15 μm.

* * * * *

UNITED STATES PATENT AND TRADEMARK OFFICE
CERTIFICATE OF CORRECTION

| | | |
|---|---|---|
| PATENT NO. | : 11,276,859 B2 | Page 1 of 1 |
| APPLICATION NO. | : 16/560522 | |
| DATED | : March 15, 2022 | |
| INVENTOR(S) | : Eunjoo Lee et al. | |

It is certified that error appears in the above-identified patent and that said Letters Patent is hereby corrected as shown below:

In the Claims

Column 18, Line 37, Claim 11      delete "polyimide" and insert -- polyamide --.

Signed and Sealed this
Second Day of May, 2023

Katherine Kelly Vidal
*Director of the United States Patent and Trademark Office*